June 11, 1929.  F. D. McGINLEY ET AL  1,716,927
ANTISKID DEVICE FOR VEHICLE WHEELS
Filed Nov. 28, 1927  2 Sheets-Sheet 1
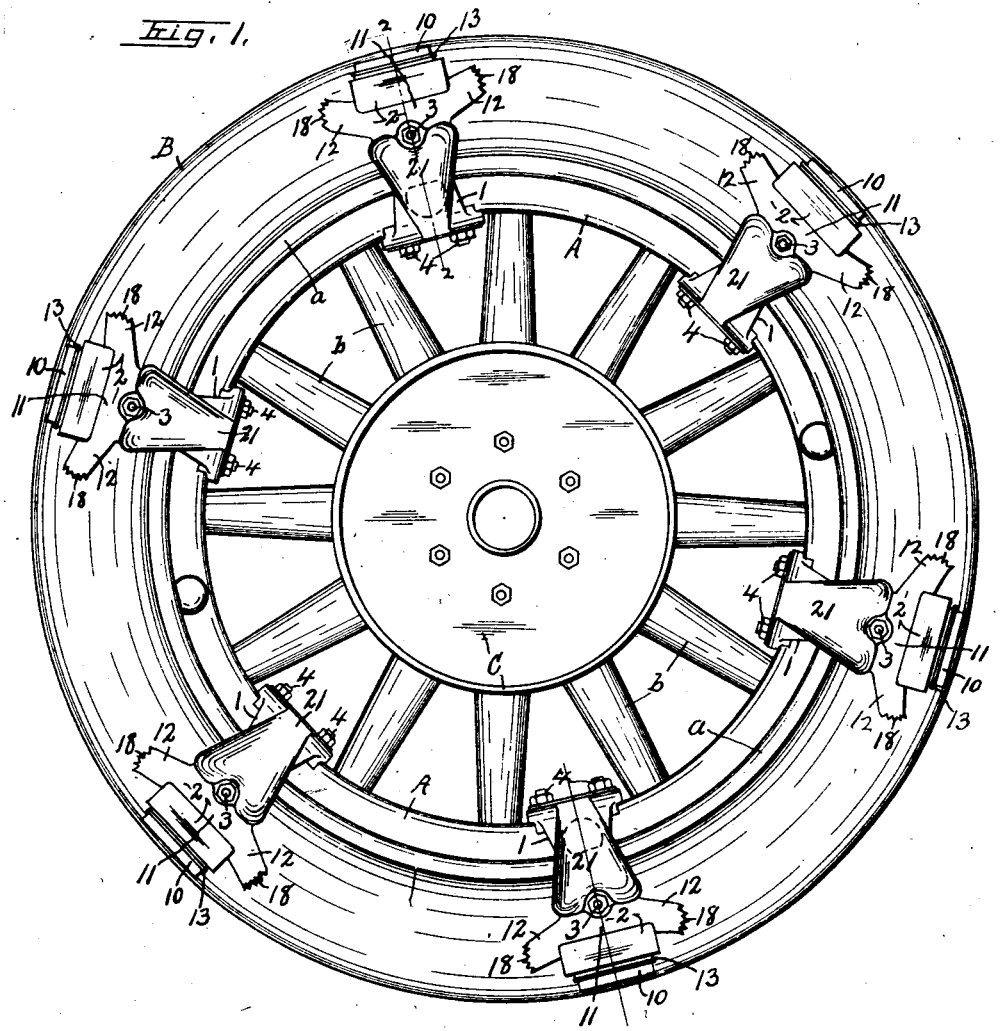

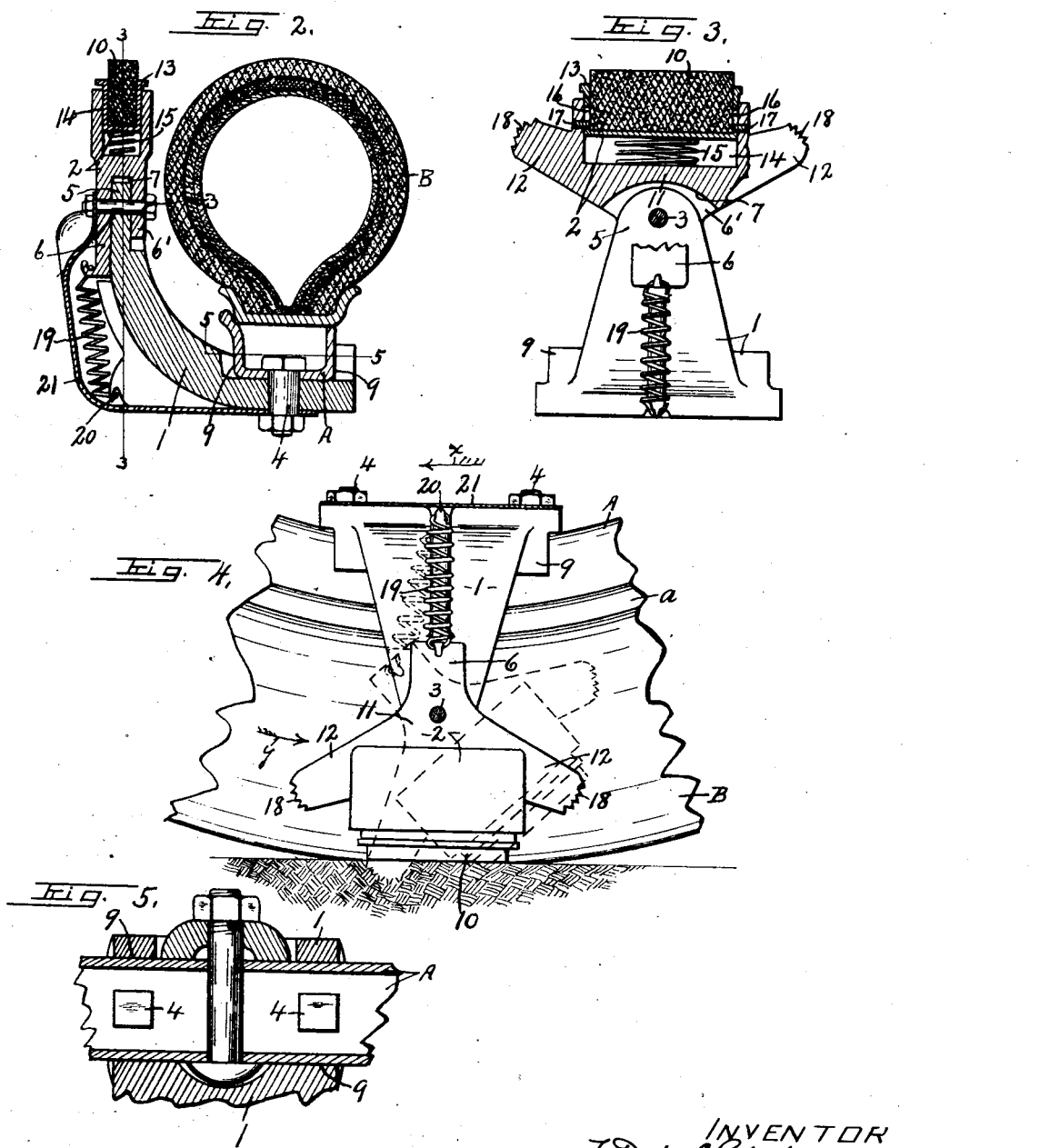

Patented June 11, 1929.

1,716,927

UNITED STATES PATENT OFFICE.

FREDERICK D. McGINLEY AND WALTER K. ZINSMEISTER, OF SYRACUSE, NEW YORK.

ANTISKID DEVICE FOR VEHICLE WHEELS.

Application filed November 28, 1927. Serial No. 236,259.

This invention relates to an anti-skid device for vehicle wheels in which a pavement-engaging member is pivotally mounted upon a suitable support on the wheel to rock about an axis parallel with the axis of the wheel and preferably along the inner end face of the tire in spaced relation thereto.

This pavement-engaging member is provided with a tread surface normally in approximately the arc of movement of or at a distance from the center of the wheel corresponding approximately to the radius of said wheel so as to normally roll along the pavement with the tread of the tire when the vehicle is moving at a speed proportionate to the normal speed of rotation of the wheel, but adapted to rock said member about the axis of its pivot by contact with the pavement in case the tread of the tire should slip upon the pavement either by loss of traction on wet or icy pavements or in case of retarded rotation of the wheels by the application of the brakes when the momentum of the vehicle exceeds the normal speed of rotation of the traction wheels.

The main object is to provide the pavement-engaging member with a tread portion adapted to roll with the tread of the tire upon the pavement under normal rolling traction of the tire tread with the pavement, and to automatically rock said member by contact with the pavement in case of loss of traction or slipping of the tire tread on the pavement to automatically bring another tread portion of the rocking member into dragging contact with the pavement to produce the desired traction and prevent slipping of the wheel on the pavement.

Another object is to provide means for yieldingly holding the rocking member in its normal position for rolling contact with the pavement with the tread of the tire.

A further object is to yieldingly hold the first-named tread portion on the rocking member so that it may be depressed to a limited extent to correspond to the depression of the tread of the tire and thereby to maintain a normal rolling engagement with the pavement in approximately the same plane as the tire tread.

A further object is to protect the springs and adjacent portions of the anti-skid device against contact with external objects and also against rain, snow and ice.

Other objects and uses relating to specific parts of the anti-skid device will be brought out in the following description.

In the drawings:—

Figure 1 is a side view of a wheel showing a plurality of, in this instance six, improved anti-skid devices mounted thereon.

Figure 2 is an enlarged transverse sectional view taken on line 2—2, Figure 1.

Figure 3 is a sectional view taken in the plane of line 3—3, Figure 2 except that the spring and adjacent portion of the rocking member are shown in elevation.

Figure 4 is an enlarged face view of a portion of the vehicle tire and felloe and one of my improved anti-skid devices in operative position with the yielding tread portion of said rocking member in engagement with the pavement, the dotted lines indicating the change of position of the rocking member for causing another portion thereof to engage the pavement in case of the loss of traction or slipping of the tread of the tire upon the pavement.

Figure 5 is an enlarged detail sectional view taken in the plane of line 5—5, Figure 2.

In order that our invention may be clearly understood we have shown an ordinary vehicle wheel as commonly used on motor vehicles and comprising a felloe —A— having the usual demountable rim —a— for receiving and supporting a pneumatic or other resilient tire —B—, said wheel being provided with the usual hub operatively connected to the felloe —A— by spokes —b— or equivalent means for holding the felloe and rim concentric with the axis of the wheel. This wheel is also provided with the usual brake drum —C— adapted to be engaged by a brake band or brake shoes commonly employed on the rear and front wheels of motor vehicles.

The anti-skid device forming the subject matter of the present invention may be mounted upon any one or more of the four wheels of the vehicle to which brakes are adapted to be applied and are preferably mounted upon the felloe of the wheel in uniformly spaced relations circumferentially so as to extend across the inner face of the rim and tire in spaced relation thereto, with certain portions of their tread surfaces a distance from the center of the wheel corresponding approximately to the radius of the periphery of the tire so as to roll with the tread of the tire upon the pavement under normal propulsion of the vehicle.

These anti-skid devices are identical in construction and each comprises a supporting member or bracket —1— and a pavement-engaging member —2— pivoted to the bracket by a pivotal bolt or stud —3— to rock about an axis parallel with the axis of the wheel.

The bracket —1— is angular in cross section and has one side thereof applied to the inner face of the felloe —A— between adjacent spokes and secured thereto by clamping bolts —4— extending through registering openings in the inner side of the felloe and adjacent portion of the bracket —1—.

The other arm of the bracket extends inwardly and outwardly across the inner face of the tire —B— in spaced relation thereto to about the longitudinal center of said tire, and is provided with a substantially flat outward extended terminal end —5— approximately radial to the axis of the wheel for receiving and supporting the pavement engaging member —2—.

This pavement-engaging member —2— is provided with inwardly extending lugs or ears —6— and —6'— in axially spaced relation to form a slot —7— for receiving the flat portion —5— of the bracket —1—, and are pivotally secured to said bracket by the pivotal bolt —3— as shown in Figure 2 to permit the member —2— to rock laterally about an axis parallel with the axis of the wheel. The bracket —1— is provided with shoulders —9— for engaging opposite end faces of the felloe —A— to relieve the clamping bolts —4— from excessive shearing strains when circumferential stress is applied to the outer ends of the brackets by the gripping engagement of the tread member —4— with the pavement in a manner hereinafter more fully explained.

The pivotal connection —3— between the rocking member —2— and its supporting bracket —1— is located substantially midway between the felloe —A— and tread of the tire —B— and therefore the arc of movement of the rocking member is of relatively short radius as compared with the radius of the tread of the tire to cause the tread portions of the pavement-engaging member —2— to instantly engage the pavement in case the tread of the tire should lose its traction or slip upon the pavement, as for example, when driving the vehicle forwardly on slippery pavements or when retarding the progress of the vehicle by the application of the brakes.

As illustrated, this pavement-engaging member —2— comprises a central resilient tread section —10— and a carrier section —11— which latter is pivotally connected by the bolt —3— to the outer end of the bracket —1—, and is provided with arms —12— extending in opposite directions from the resilient section —10— circumferentially of the tire.

The resilient section —10— is preferably made of soft rubber and is mounted in a supporting box —13— which in turn is movable radially in a guide opening or socket —14— in the outer face of the central portion of the section —11—. A coil spring —15— is interposed between the inner wall of the box section —13— and inner wall of the socket —14— to yieldingly support the box section and its resilient tread section —10— in their extreme outer positions. This sliding movement of the box section —13— with the resilient member —10— therein is permitted by providing the opposite ends of the box section with slots —16— for receiving screws —17— which are engaged in threaded apertures of the inner end walls of the socket —14— and project into the slots —16— for engaging the end walls of the slots and thereby limiting the radial movement of the box —13— and resilient member —10—.

These screws —17— also engage opposite ends of the resilient section —10— to assist in holding the latter against outward displacement from the box section —13—, but in practice the resilient section —10— is preferably cemented to the inner walls of the box —13— so as to project outwardly an appreciable distance beyond the outer ends of the box for yielding contact with the pavement as the wheel is rolled along said pavement.

In other words the resiliency of the section —10— and the spring —15— serve to keep the tread surface of the section —10— in approximately the arc of movement of the tread of the tire so as to roll along the pavement therewith under normal movement of the vehicle, it being understood that the tread section —10— yields radially with the yielding movement of the tread of the tire on the pavement.

The arms —12— of the pivoted section —11— extend beyond opposite ends of the tread section —10— equal distances from the axis of the pivot —3— greater than the distance from said axis to the tread face of the section —10—, and are provided with outer serrated end faces —18— normally some distance within the plane of the outer surface of the tread section —10—, and also some distance within the arc of movement of the tread of the tire so as to avoid contact with the pavement under normal running conditions of the vehicle.

The rocking section —11— and its yielding section —10— are yieldingly held in a medial position by means of a coil spring —19— having one end attached to the inner end of the arm —6—, and its other end attached or anchored at —20—, to a portion of the bracket —1—, said spring being normally disposed in a direct line between the axis of the pivot —3— and the axis of the wheel, and is placed under sufficient tension to normally retain the rocking section —11— and its resilient tread section —10— in their medial positions.

A sheet metal housing —21— is applied to the inner face of the bracket —1— to cooperate with said bracket in housing the spring —19— and adjacent arm —6— of the rocking section —11— and is held in operative position by the clamping bolts —4— and pivotal bolt 3 as shown in Figure 2.

In view of the fact that all of the anti-skid devices are identical in construction, the description given for one applies to the others.

Operation.

It will now be evident that under normal running conditions of the vehicle the resilient tread section —10— will roll along and upon the pavement in substantially the same manner as the tread of the tire, and will yield inwardly against the action of the spring —15— to correspond with the normal yielding movement of the tread of the tire or when engaging obstacles in its path without rocking the member —11— to its pavement-engaging position.

On the other hand if the rolling motion of the wheel along the pavement is retarded disproportionately to the movement of the vehicle, or the momentum of the vehicle exceeds the normal rolling action of the wheels, the frictional engagement of one or the other of the tread sections —10— with the pavement will cause a rocking movement of the section —11— about the axis of the pivot —3— to engage the outwardly rocking arm —12— with the pavement to effect a dragging movement therein, and thereby to instantly check the slipping movement of the wheel upon the pavement.

For example, assuming that the vehicle is moving in the direction indicated by arrow X, Figure 4, and that the wheel is rotating in the direction indicated by the arrow Y in the same figure, then as the brakes are applied to retard the rolling movement of the wheel disproportionately to the momentum of the machine, the tread member —10— will tend to slide along the pavement by its frictional engagement therewith, and will cause the section —11— to rock about its pivot to the position shown by dotted lines in Figure 4, thereby causing the left hand arm —12— to engage the pavement, and instantly check any tendency of the wheel to slip along the pavement.

Again if power is applied to the wheel to drive the vehicle in the direction indicated by arrow X resulting in the movement of the wheel in the direction of arrow Y and the wheel should slip upon the pavement, the engagement of the pavement with the resilient member —10— would cause the member —11— and parts carried thereby to rock in a reverse direction from that indicated by dotted lines, thus binging the outer end of the right hand arm —12— into engagement with the pavement to resist the slipping action of the wheel and produce sufficient traction to propel the vehicle in the desired direction.

It is evident that similar action of the member —11— will take place under like conditions as the vehicle is propelled in a direction opposite that indicated by the arrows.

It will be observed upon referring to Figure 3 that the ends of the outer wall of the slot —7— are adapted to engage opposite edges of the bracket —1— for limiting the rocking movement of the member —2— in both directions, the movement being sufficient to allow both of the arms —12— to engage with the pavement under the rocking action previously described

What we claim is:

1. In an anti-skid device for vehicle wheels, a pavement-engaging member pivotally mounted on the wheel to swing circumferentially of the wheel and provided with a resilient tread surface and a rigid tread surface, both surfaces being wholly at one side of the tread of the tire, yielding means normally holding said members in position for engaging its resilient surface with the pavement and its rigid surface out of engagement with the pavement, said rocking member being actuated by the engagement of the resilient surface with the pavement in case of slippage of the wheel to force the rigid ssurface into engagement with the pavement.

2. In an anti-skid device for vehicle wheels having a resilient tire, a support having means for securing it to the wheel, and a rocking member pivoted to said support and provided with pavement-engaging portions in circumferentially spaced relation about and at unequal distances from the axis of the pivot, the portion at the lesser distance from said axis being resilient.

3. In an anti-skid device for vehicle wheels having a resilient tire, a pivoted rock arm having a medial resilient pavement-engaging surface and rigid pavement-engaging surfaces at opposite sides of the resilient surface, said rigid surfaces being disposed at greater distances from the axis of the pivot than the resilient surfaces, and means for pivotally supporting the rock arm on the wheel with the resilient surface a distance from the axis of the wheel approximately equal to the radius of the tire tread.

In witness whereof we have hereunto set our hands this 22nd day of November, 1927.

FREDERICK D. McGINLEY.
WALTER K. ZINSMEISTER.